United States Patent
Cheung

(10) Patent No.: US 11,408,825 B2
(45) Date of Patent: Aug. 9, 2022

(54) FORENSIC DETECTOR AND THE SYSTEM THEREOF

(71) Applicant: Hong Kong Applied Science and Technology Research Institute Company Limited, Hong Kong (CN)

(72) Inventor: Hoi Ching Cheung, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 141 days.

(21) Appl. No.: 16/948,041

(22) Filed: Aug. 28, 2020

(65) Prior Publication Data
US 2022/0065782 A1    Mar. 3, 2022

(51) Int. Cl.
*G01N 21/64*      (2006.01)
*H04M 1/72409*      (2021.01)
*G02B 27/14*      (2006.01)

(52) U.S. Cl.
CPC ........ *G01N 21/64* (2013.01); *H04M 1/72409* (2021.01); *G01N 2021/6417* (2013.01);
(Continued)

(58) Field of Classification Search
CPC .......... G01N 21/64; G01N 2021/6417; G01N 2201/0633; G01N 2201/0636; H04M 1/72409; H04M 2250/52; G02B 27/141
See application file for complete search history.

(56) References Cited

U.S. PATENT DOCUMENTS

| 6,177,247 B1 | 1/2001 | Mathies et al. |
| 6,868,285 B2 | 3/2005 | Muller-Dethlefs |

(Continued)

FOREIGN PATENT DOCUMENTS

| CN | 101375150 A | 2/2009 | |
| CN | 107209118 A | 9/2017 | |
| JP | 2016085112 A | * 5/2016 | ............. G01N 21/64 |

OTHER PUBLICATIONS

Virkler et al.; Raman spectroscopy offers great potential for the nondestructive confirmatory identification of body fluids; Forensic Science International; Oct. 25, 2008; vol. 181, Issues 1-3; pp. e1-e5; Elsevier.

(Continued)

*Primary Examiner* — Kiho Kim
(74) *Attorney, Agent, or Firm* — Spruson & Ferguson (Hong Kong) Limited

(57) ABSTRACT

A forensic detector for remotely sensing a porphyrin-containing substance on a surface of an object is provided. The forensic detector includes an excitation light source for generating an excitation light beam, plural optical elements, one or more sensors for measuring a first and second radiation powers, and a computer processor. The excitation light beam has an excitation wavelength capable of exciting porphyrin to luminesce at a target wavelength centered between 665-675 nm. The first and second radiation powers are in non-overlapping wavelength regions of the object-originated light beam. The computer processor is configured to compute a SNR according to the first radiation power and a background noise power level, and to determine if the porphyrin-containing substance is present on the surface according to the SNR. The background noise power level is obtained from the one or more second radiation powers.

16 Claims, 13 Drawing Sheets

(52) U.S. Cl.
CPC ............ *G01N 2201/0633* (2013.01); *G01N 2201/0636* (2013.01); *G02B 27/141* (2013.01); *H04M 2250/52* (2013.01)

(56) References Cited

U.S. PATENT DOCUMENTS

| | | | |
|---|---|---|---|
| 7,186,990 | B2 | 3/2007 | Powers et al. |
| 7,545,969 | B2 | 6/2009 | Bennett et al. |
| 8,467,053 | B2 | 6/2013 | Lednev et al. |
| 2009/0092281 | A1 | 4/2009 | Treado et al. |
| 2010/0255523 | A1* | 10/2010 | Mik ............... A61K 49/0021 435/29 |
| 2014/0065290 | A1 | 3/2014 | Lewis et al. |
| 2015/0198528 | A1 | 7/2015 | Manneh |
| 2017/0002394 | A1* | 1/2017 | Choi ............... G06V 20/693 |
| 2019/0145889 | A1* | 5/2019 | Cunningham ....... G01J 3/0208 356/414 |
| 2019/0269363 | A1 | 9/2019 | Vilenskii |
| 2020/0261602 | A1 | 8/2020 | Desai et al. |

OTHER PUBLICATIONS

Nanda et al.; A rapid and noninvasive method to detect dried saliva stains from human skin using fluorescent spectroscopy; Journal of Oral and Maxillofacial Pathology; Jan.-Apr. 2011; vol. 15, Issue 1; pp. 22-25 Medknow Publications.

Fiedler et al.; Detection of Semen (Human and Boar) and Saliva on Fabrics by a Very High Powered UV-/VIS-Light Source; The Open Forensic Science Journal; Feb. 11, 2008; vol. 1; Bentham Science Publishers Ltd.

International Search Report and Written Opinion of PCT application No. PCT/CN2020/114847 issued from the International Search Authority dated May 31, 2021.

* cited by examiner

FORENSIC DETECTOR AND THE SYSTEM THEREOF

LIST OF ABBREVIATIONS

COVID-19 Coronavirus disease 2019
DNA Deoxyribonucleic acid
LED Light-emitting diode
MCU Micro-controller
NIR Near infrared
PL Photoluminescence
SNR Signal to noise ratio
UV Ultra violet

FIELD OF THE INVENTION

The present disclosure generally relates to an apparatus and a system for detecting facial residue by spectroscopy, and particularly relates to an apparatus and a system for remotely sensing a porphyrin-containing substance on a surface of an object by extracting PL signal from a reflected forensic light.

BACKGROUND OF THE INVENTION

The detection of body fluids and stains is a major part of forensic investigation today. This is a scientific process for solving a crime and collecting crime-related evidence. In certain circumstances, the forensic investigation may also be used for performing corporate investigations and infidelity investigations. The evidence may not only be limited to human body fluids but may also include other chemicals and substances.

The gathering of information by forensic detection is not an accessible and inexpensive technology for most individuals. Usually, forensic detection may involve intensive laboratory work with the use of equipment such as DNA sequencer, fluorescence, microscope, liquid chromatography, and mass spectrometer. Therefore, the analysis is expensive and time-consuming, which may involve a large amount of chemicals.

Other portable options are also available for preliminary analysis, such as the use of laser, LED pointer, forensic toolbox, video spectral comparator, and other imaging systems. The on-site investigator uses some of these portable devices for spotting the body fluids. However, the elemental information may not be identified immediately, and further analysis in the laboratory is generally required.

The use of forensic detection is not limited to the crime-scene investigation. Since the worldwide outbreak of the COVID-19 pandemic, there have been reports of irresponsible and illegal sellers repackaged and sold used face masks. One case was reported in Thailand, where a store sold up to 200,000 used face masks, and similar unlawful sellers were found in India, China, and Hong Kong. Re-using face mask of another person, even if it is treated with alcohol or high temperature, will pose a severe risk of inflection to the wearer. In order to determine whether the face mask is used, the forensic investigation apparatus may be used to detect the presence of body fluids or saliva, which provides evidence to show if the face mask is new.

Apart from the face masks, forensic detection may also be used in other applications for hygiene check. There were reports that some hotels did not change the bedding, such as the bedsheet and pillow cover, between guests. Under all circumstances, particularly with the COVID-19 pandemic, the bedding should be changed to ensure that the hygiene is up to the basic standard and to prevent any infectious diseases from transmitting between guests staying in the same hotel room. The cleanliness of bedding may not be determined easily without a proper apparatus, and there is a need for an apparatus that can be used by the travelers to perform hygiene checks conveniently and accurately.

The common techniques in the forensic community for the identification of body fluids include the color spot tests with a confirmatory test of blood and semen, Raman spectroscopy and NIR Raman spectroscopy for confirmatory analysis of body fluids and fluorescence of biological materials and microorganisms.

However, existing techniques suffer from several drawbacks. The color tests are destructive to the sample and can also give a false-positive result. Furthermore, most confirmatory tests cannot support an on-site investigation, and the in-depth analysis must be carried out in a laboratory.

U.S. Pat. No. 7,545,969B2 discloses a system for detecting and analyzing forensic evidence using UV fluorescence imaging. The system flashes a pulse of UV light and immediately captures a digital image by a digital camera for detecting materials of forensic interest, such as saliva, semen, and sweat, fluoresce at approximately 300 nm. However, there is no description of the use of the UV fluorescence imaging for detecting face oil, and the system having xenon lamp, digital camera, and a computer is overly complex and may only be used by professional investigators. This is not a forensic detector suitable for different levels of users.

U.S. Pat. No. 8,467,053B2 discloses a method of identifying types of body fluids in a sample by Raman spectroscopy. The target elements include blood, saliva, and sweat. The sample is exposed to a 785 nm laser light for excitation, and thereby a Raman spectroscopic signature is produced for identifying the type of body fluid. The result is ranged from 518 to 1654 $cm^{-1}$ and there is no description of the use for detecting face oil. This method requires a spectrometer with a library of reference Raman spectroscopic signatures for different specific types of body fluids, and the investigation is not likely to be an affordable and portable analysis.

Further, the UV fluorescence imaging and the Raman spectroscopy can be interfered with by fluorescence. If the sample contains molecules that fluoresce, the broad and much more intense fluorescence peak observed may distort the image captured and cover the sharp Raman peaks of the sample. Besides, while analyzing the signals, the interference of background signals and/or scattered excitation signals may leave a conclusion of a false-positive result.

Other methods and systems disclosed in US 2009/0092281A1, U.S. Pat. No. 6,868,285B2, US 2019/0269363A1, and U.S. Pat. No. 7,186,990B2 also failed to provide a non-destructive method that can detect facial residue and other body fluid in real-time accurately. The use of forensic investigation with these conventional approaches cannot allow non-professional individuals to operate a fast in-situ analysis conveniently with a low probability of false-positive results.

Accordingly, there is a need in the art for an apparatus and a system that seeks to address at least some of the above problems by performing non-invasive forensic detection of facial residue and other body fluids in a real-time, non-destructive, accurate, and portable manner. Furthermore, other desirable features and characteristics will become apparent from the subsequent detailed description and the appended claims, taken in conjunction with the accompanying drawings and this background of the disclosure.

SUMMARY OF THE INVENTION

Provided herein are an apparatus and a system for detecting facial residue by spectroscopy. It is an objective of the present disclosure to provide a fast and reliable method for remotely sensing a porphyrin-containing substance on the surface of an object using a compact device in a fast and portable manner.

In accordance with certain embodiments of the present disclosure, a forensic detector for remotely sensing a porphyrin-containing substance on a surface of an object is provided. The forensic detector comprises an excitation light source, plural optical elements, one or more sensors, and a computer processor. The excitation light source generates an excitation light beam, wherein the excitation light beam has an excitation wavelength capable of exciting porphyrin to luminesce at a target wavelength centered between 665-675 nm. The plural optical elements are configured and arranged to direct the excitation light beam onto the surface and to capture an object-originated light beam coming from the surface. The one or more sensors are configured to measure a first radiation power in a first wavelength region of the object-originated light beam, and to measure one or more second radiation powers in a second wavelength region thereof, wherein the first wavelength region includes the target wavelength, and wherein the first and second wavelength regions are non-overlapping. The computer processor is configured to compute a SNR according to the first radiation power and a background noise power level, and is further configured to determine if the porphyrin-containing substance is present on the surface according to the SNR, wherein the background noise power level is obtained from the one or more second radiation powers.

In accordance with a further aspect of the present disclosure, the computing processor is configured to control the excitation light source and the one or more sensors such that the one or more sensors measure the first and second radiation powers while the excitation light beam is generated and directed to the surface.

Preferably, the one or more sensors are controlled to simultaneously measure the first and second radiation powers.

In accordance with a further aspect of the present disclosure, the excitation wavelength is in a range of 350-450 nm such that the excitation light beam contains long-wave ultraviolet or blue light.

In accordance with a further aspect of the present disclosure, the optical elements comprise a dichroic mirror located on an intersection of a forward path of the excitation light beam emitted from the excitation light source, and a return path of the object-originated light beam coming from the object.

Preferably, the optical elements further comprise a collimating lens located between the dichroic mirror and the object for directing the excitation light beam onto the surface and collimating the object-originated light beam onto the dichroic mirror.

In accordance with a further aspect of the present disclosure, the one or more sensors are configured to obtain a time sequence of first radiation power values each being a measurement of the first radiation power obtained at one time instant. The computer processor is configured to filter the time sequence of first radiation power values for noise reduction.

In accordance with a further aspect of the present disclosure, the SNR is computed as the first radiation power divided by the standard deviation of the background noise power level at regions other than the first wavelength region.

In accordance with a further aspect of the present disclosure, the computer processor is configured to compare the SNR with a threshold defined by a plurality of reference SNRs obtained from reference objects with and without the porphyrin-containing substance.

In accordance with a further aspect of the present disclosure, the optical elements are arranged to extract first and second light components of the object-originated light beam simultaneously, the first and second light components respectively having wavelength contents on the first wavelength region and on the second wavelength region. The optical elements are arranged to measure the first and second radiation powers simultaneously.

Preferably, the porphyrin-containing substances exhibit photoluminescence (PL) when excited by the excitation light beam.

In accordance with certain embodiments of the present disclosure, a system for remotely sensing a porphyrin-containing substance on a surface of an object and determining a concentration of the porphyrin-containing substance. The system comprises a smartphone and the forensic detector mountable on and communicable to the smartphone. Preferably, the smartphone is configured to capture an image of the surface after the excitation light beam irradiates the surface. A porphyrin distribution map having a red pigmented region for indicating a respective region on the surface containing the porphyrin-containing substance is generated from the image. The computing processor is configured to use the SNR for determining the concentration of the porphyrin-containing substance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

Figure 1:
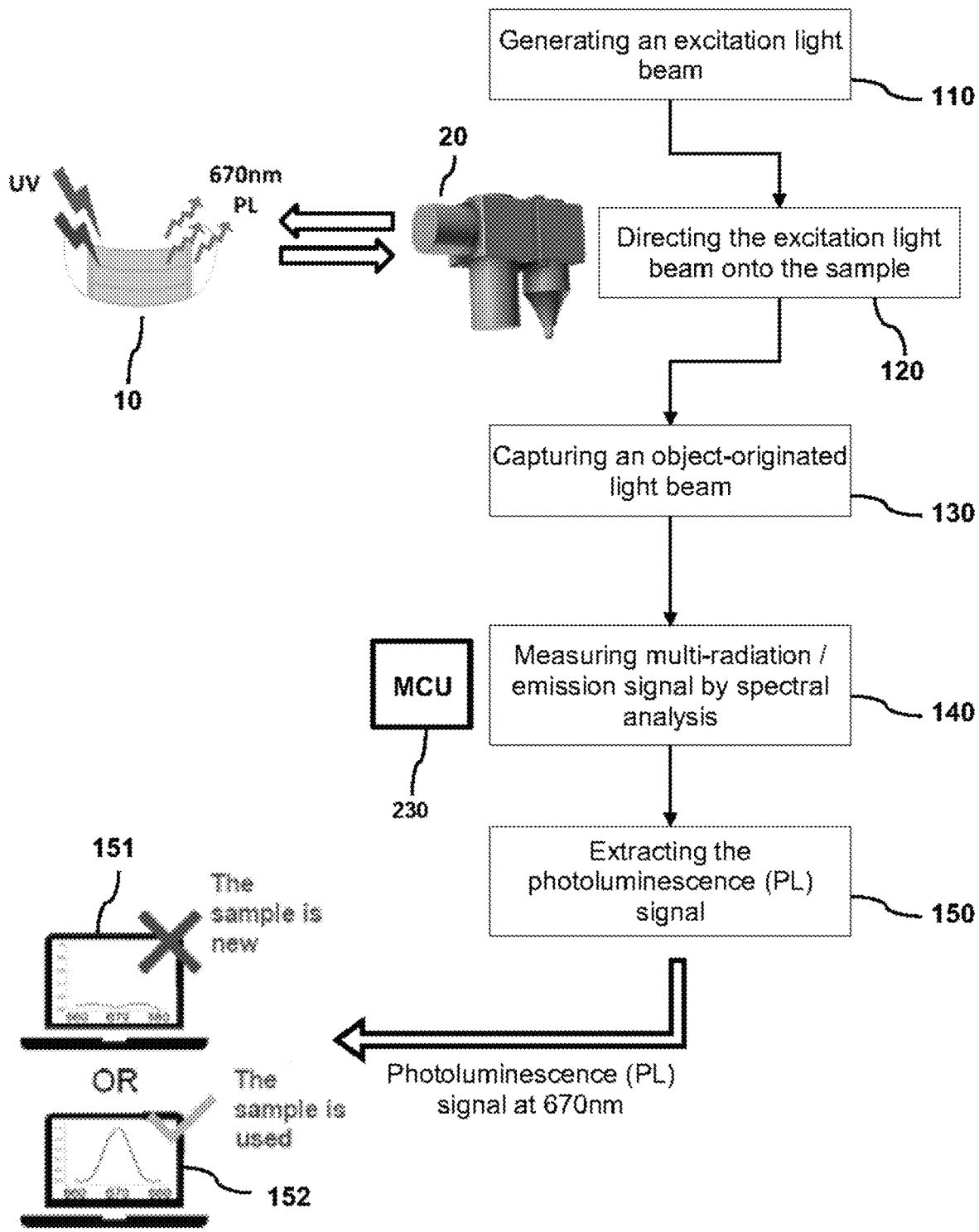
FIG. 1 depicts a flow diagram illustrating the method for remotely sensing a porphyrin-containing substance by extracting PL signal from the reflected forensic light in accordance with certain embodiments of the present disclosure.

Skilled artisans will appreciate that elements in the figures are illustrated for simplicity and clarity and have not necessarily been depicted to scale.

DETAILED DESCRIPTION OF THE INVENTION

The present disclosure generally relates to an apparatus and a system for remotely sensing facial residue by spectroscopy. More specifically, but without limitation, the present disclosure relates to an apparatus and a system for remotely sensing a porphyrin-containing substance by extracting PL signal from reflected forensic light. An objective of the present disclosure is to provide a forensic detector for performing non-invasive forensic detection of facial residue and other body fluid in a fast and portable manner.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

The term "facial residue", as used herein, broadly includes all kinds of material that may adhere to an object when contacting with the skin, such as face oil, cosmetic powder, cleansing oil, other porphyrin-containing proteins, or the like, or any combination thereof.

The term "body fluid", as used herein, refers to fluids excreted or secreted by the body, as well as fluids that are not normally excreted or secreted by the body, including, but not limited to, blood, semen, saliva, sweat, earwax, cerumen, tears, urine, or the like, or any combination thereof.

The term "computer processor", as used herein, generally refers to all types of digital processing devices, including, without limitation, a microcontroller unit, a custom integrated circuit, digital signal processors, a field-programmable gate array, application-specific integrated circuits, a central processing unit, a graphics processing unit, a computer device, a programmable I/O device, other semiconductor devices, or any combination thereof.

Furthermore, as used herein, the term "about" or "approximately", when used in conjunction with a numerical value or range of values, refers preferably to a range that is within 5 percent, or more preferably within 1 percent of a value with which the term is associated. The use of any and all examples, or exemplary language (e.g., "such as") provided herein, is intended merely to better illustrate the invention and does not pose a limitation on the scope of the invention unless otherwise claimed.

It is desirable to have a forensic detector for performing non-invasive and low-cost forensic detection of facial residue and other body fluid on an object surface in a real-time, non-destructive, accurate, and portable manner. Preferably, the forensic detector is suitable for different levels of users, and enables the quality check of a product by means of spectroscopy.

FIG. 1 depicts a flow diagram illustrating the system encompassing the method for remotely sensing a porphyrin-containing substance on a surface of an object 10 by extracting PL signal from the spectrum of the reflected forensic light. The porphyrin-containing substance may be facial residue or body fluid, and may not be distinguishable to the naked eyes. The system comprises a probe 20 having an excitation light source and one or more sensors, and a computer processor 230 configured to execute a method for determining if the porphyrin-containing substance is present on the surface. The excitation light source configured to generate an excitation light beam 110, and to direct the excitation light beam onto the surface 120. The one or more sensors captures an object-originated light beam 130 coming from the surface of the object 10 for spectral analysis. The computer processor is configured to perform spectral analysis 140 and extract a PL signal 150 for determining whether the porphyrin-containing substance is present on the surface.

In certain embodiments, a probe 20 is used to irradiate the surface of an object 10 with an excitation light beam. The object 10 is a test sample, either a solid or liquid, for performing forensic detection, which may be a face mask, a pillow cover, a bedsheet, a tissue paper, clothes, or other fabrics or products for hygiene examination. Potentially, the object 10 contains one or more types of the porphyrin-containing substances that are subjected to spectroscopy, wherein the porphyrin-containing substances may include facial residue and body fluid. The excitation light beam has an excitation wavelength capable of exciting porphyrin to luminesce at a target wavelength centered between 665-675 nm.

In accordance with the present disclosure, the excitation light beam is in a range of 350-450 nm in wavelength such that the excitation light beam contains long-wave ultraviolet or blue light. The object 10, upon directing the excitation light beam onto the surface 120, an object-originated light beam 130 originated from the object 10 will be reflected to and captured by the probe 20 or other detectors. The porphyrin-containing substance, when exposed to the excitation light beam, will be caused to undergo an electronic transition. From the spectral information of the object-originated light beam, at least one peak radiation power in a first wavelength region having a center wavelength centered between 665-675 nm is observed. Such fluorescence is typically at a longer wavelength as compared to the excitation light beam, and advantageously, the present disclosure identifies that the excitation light beam has an excitation wavelength capable of exciting porphyrin to luminesce at a target wavelength, which is included in the first wavelength region. Therefore, in order to determine the presence of the porphyrin-containing substance, one or more sensors are arranged to capture an object-originated light beam 130 for the processor 230 to perform spectral analysis. The purpose of the spectral analysis is to detect the first radiation power being in the first wavelength region, wherein the first wavelength region has a center wavelength centered between 665-675 nm.

In certain embodiments, the spectral analysis on the object-originated light beam is performed to detect a multi-radiation or emission signal 140 including two or more radiation powers, which comprises a first radiation power and one or more second radiation powers, wherein each of the second radiation powers is also measured by the one or more sensors but in a second wavelength region of the object-originated light beam. The second radiation power is considered as a background signal, and the first wavelength regions and the second wavelength regions are non-overlapping. A comparison between the multi-radiation or emission signal can be used to determine the presence of the porphyrin-containing substance. In one exemplary embodiment, the second wavelength region is approximately 620 nm.

In certain embodiments, a time sequence of first radiation power values is obtained by the one or more sensors, each being a measurement of the first radiation power obtained at one time instant. A computer processor is used to filter the time sequence of first radiation power values for noise reduction.

A quantitative assessment is performed, which uses SNR according to the first radiation power and the background noise power level to extract a PL signal 150, for determining if the porphyrin-containing substance is present on the surface. Particularly, the SNR is computed by dividing the first radiation power by the standard deviation of the background noise power level at regions other than the first wavelength region, wherein the background noise power level may be obtained from the one or more second radiation powers. The second radiation powers are obtained at the second wavelength region without overlapping with the first wavelength region, so the background noise level can be obtained without the PL signal. Then the SNR is compared with a threshold defined by a plurality of reference SNRs obtained from reference objects with and without the porphyrin-containing substance. When the SNR is lower than the threshold, the porphyrin-containing substance is not present on the surface of the object 10, and so the object 10 is considered to be "new" 151. On the other hand, when the SNR is higher than the threshold, a significant amount of the porphyrin-containing substance is present on the surface of the object 10, and so the object 10 is considered to be "used" 152. For the case of a face mask, unused sample (without the porphyrin-containing substance) and time-controlled samples (with the porphyrin-containing substance) are used as reference for determining the threshold. Big data analysis or database collection may also be utilized for the calibration study in achieving a more accurate determination on the presence of the porphyrin-containing substance.

The forensic detecting method can also be implemented using a combination of hardware without performing spectral analysis. Three configurations of the forensic detector are disclosed and shown in FIGS. 2A-2C. It is apparent that the optional elements described in illustrated embodiments may be otherwise without departing from the scope and spirit of the present disclosure.

The forensic detector includes an excitation light source 210, plural optical elements 240, one or more sensors 280, and a computer processor 230. The excitation light source 210 is configured to generate an excitation light beam, wherein the excitation light beam is in a range of 350-450 nm in wavelength. Preferably, the excitation light source 210 is a UV LED, a blue LED, a laser diode, a laser emitting module, or the like.

Figure 2A:
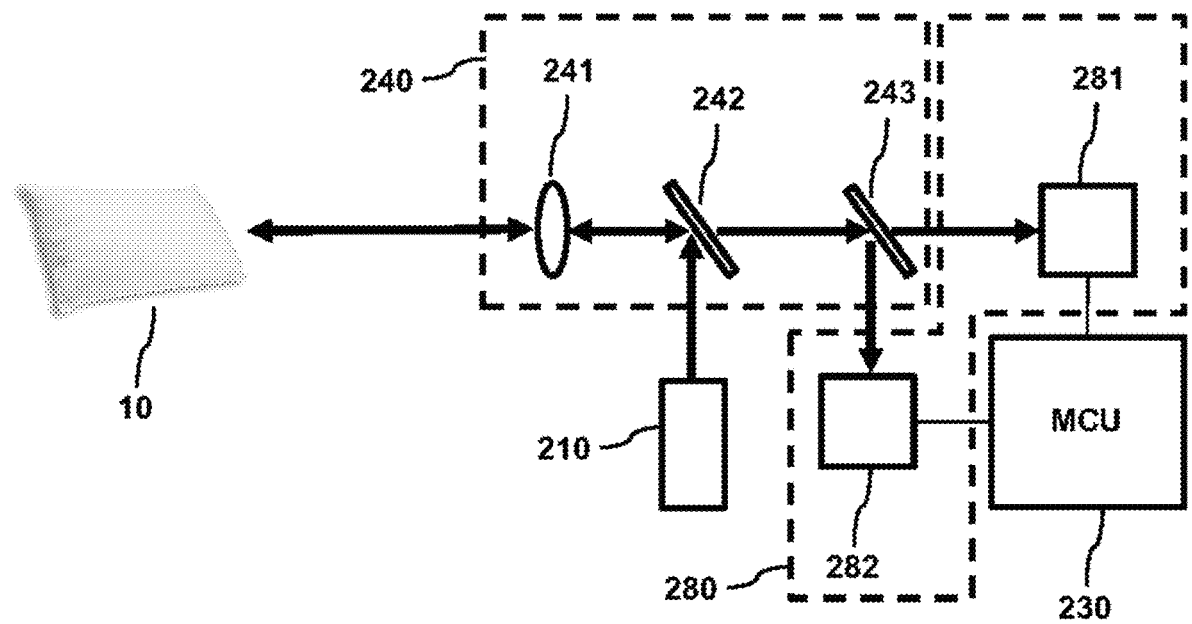
FIG. 2A depicts a system block diagram of the first configuration of the forensic detector in accordance with certain embodiments of the present disclosure.

In the first configuration shown in FIG. 2A, the plural optical elements 240 include a dichroic mirror 242, a collimating lens 241, and a beam splitter 243. The excitation light beam is directed along a forward path incidental to the dichroic mirror 242 or dichroic prism at an incident angle 45°. The dichroic mirror 242 is arranged to transmit the incident excitation light beam and bend the forward path by 90 degrees towards the collimating lens 241 or equivalents. The collimating lens 241 is located between the dichroic mirror 242 and the object 10 for directing the excitation light beam onto the surface of the object 10 to perform sensing remotely. The object 10 may contain one or more types of the porphyrin-containing substances that is subjected to spectroscopy. The excitation light beam has an excitation wavelength capable of exciting porphyrin to luminesce at a target wavelength centered between 665-675 nm, as the porphyrin-containing substances exhibit PL when excited by the excitation light beam.

After irradiating the surface of the object 10 with an excitation light beam, an object-originated light beam coming from the surface is transmitted to the forensic detector and captured by the optical elements 240. The collimating lens 241 collimates the object-originated light beam onto the dichroic mirror 242, and the object-originated light beam transmits through the dichroic mirror 242 to the beam splitter 243. Therefore, the dichroic mirror 242 is located on an intersection of a forward path of the excitation light beam emitted from the excitation light source 210, and a return path of the object-originated light beam coming from the object 10. As the one or more sensors 280 include a first sensor 281 and a second sensor 282, the beam splitter 243 is configured to split the object-originated light beam into two light beams for the first sensor 281 and the second sensor 282. The first sensor 281 is configured to measure a first radiation power in a first wavelength region of the object-originated light beam, wherein the first wavelength region includes the target wavelength. The second sensor 282 is configured to measure one or more second radiation powers in a second wavelength region of the object-originated light beam, wherein the second wavelength region and the first wavelength region are non-overlapping. In one exemplary embodiment, the second wavelength region is approximately 620 nm.

The computer processor 230 is configured to control the excitation light source 210 and the one or more sensors 280 such that the first sensor 281 measures the first radiation power and the second sensor 282 measures the one or more second radiation powers while the excitation light beam is generated and directed to the surface. In certain embodiments, the computer processor 230 is configured to control the one or more sensors 280 to simultaneously measure the first and second radiation powers. The computer processor 230 is further configured to compute an SNR according to the first radiation power and the background noise power level. Particularly, the SNR is computed as the first radiation power divided by the standard deviation of the background noise power level at regions other than the first wavelength region, wherein the background noise power level may be obtained from the one or more second radiation powers. In order to determine if the porphyrin-containing substance is present on the surface, the computer processor 230 is further configured to compare the SNR with a threshold defined by a plurality of reference SNRs obtained from reference objects with and without the porphyrin-containing substance. When the SNR is lower than the threshold, the porphyrin-containing substance is not present on the surface of the object 10. On the other hand, when the SNR is higher than the threshold, a significant amount of the porphyrin-containing substance is present on the surface of the object 10.

Figure 2B:
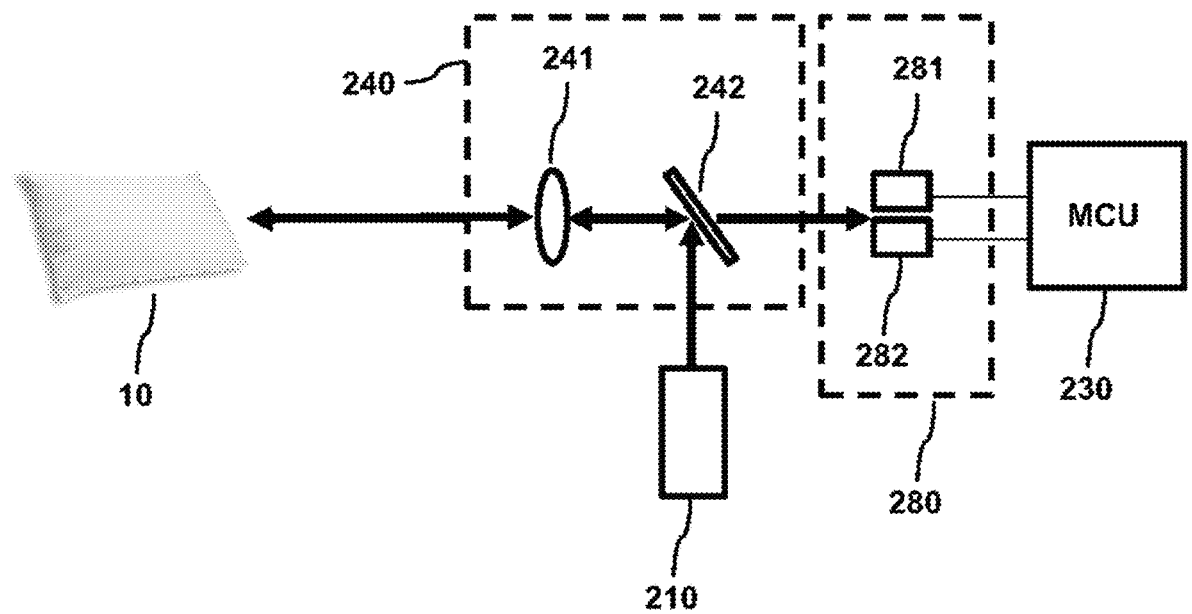
FIG. 2B depicts a system block diagram of the second configuration of the forensic detector in accordance with certain embodiments of the present disclosure.

In the second configuration shown in FIG. 2B, the plural optical elements 240 include a dichroic mirror 242 and a collimating lens 241. The first sensor 281 and the second sensor 282 are placed adjacent to each other and so a beam splitter 243 is not needed. The first sensor 281 and the second sensor 282 are configured to perform simultaneous measurement of the first and second radiation powers of the object-originated light beam. The operation and the mechanism of the forensic detector of the second configuration is similar to the first configuration.

Figure 2C:
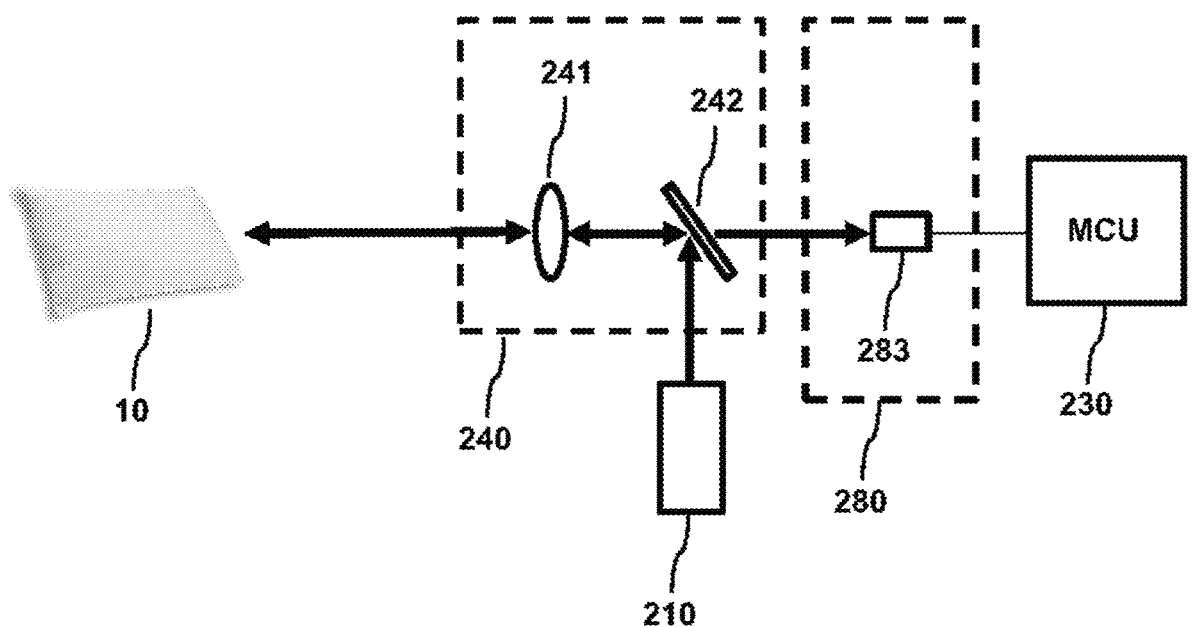
FIG. 2C depicts a system block diagram of the third configuration of the forensic detector in accordance with certain embodiments of the present disclosure.

In the third configuration shown in FIG. 2C, the plural optical elements 240 include a dichroic mirror 242 and a collimating lens 241, and the one or more sensors 280 include a multi-channel detector 283, such as a 2-channel detector, or a 3-channel detector. The multi-channel detector 283 is configured to perform simultaneous measurement of the first and second radiation powers of the object-originated light beam. The operation and the mechanism of the forensic detector of the third configuration are similar to the first configuration.

Figure 3:
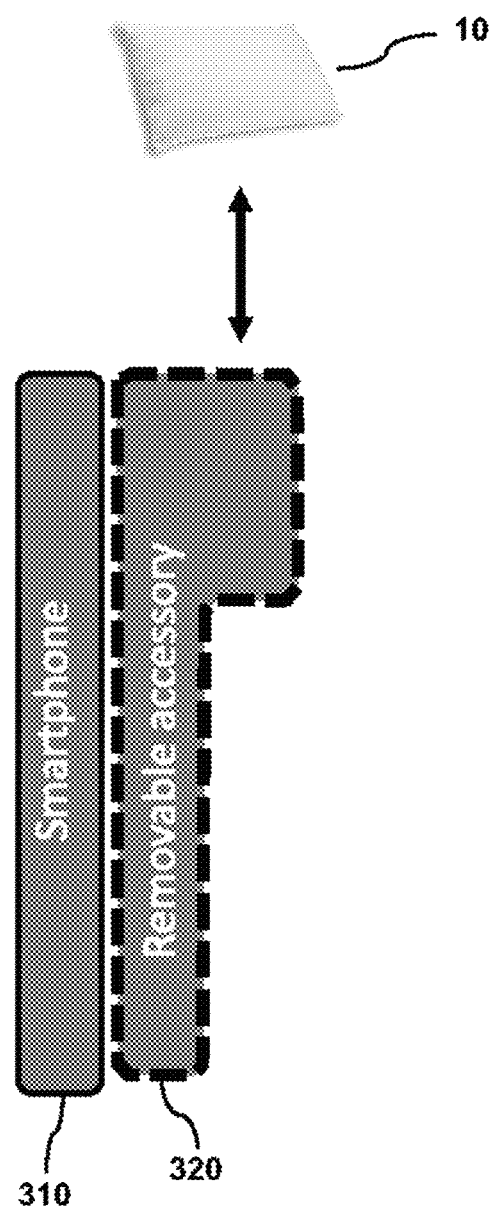
FIG. 3 depicts the system having the forensic detector as a removable accessory for a smartphone in accordance with certain embodiments of the present disclosure.
Figure 4:
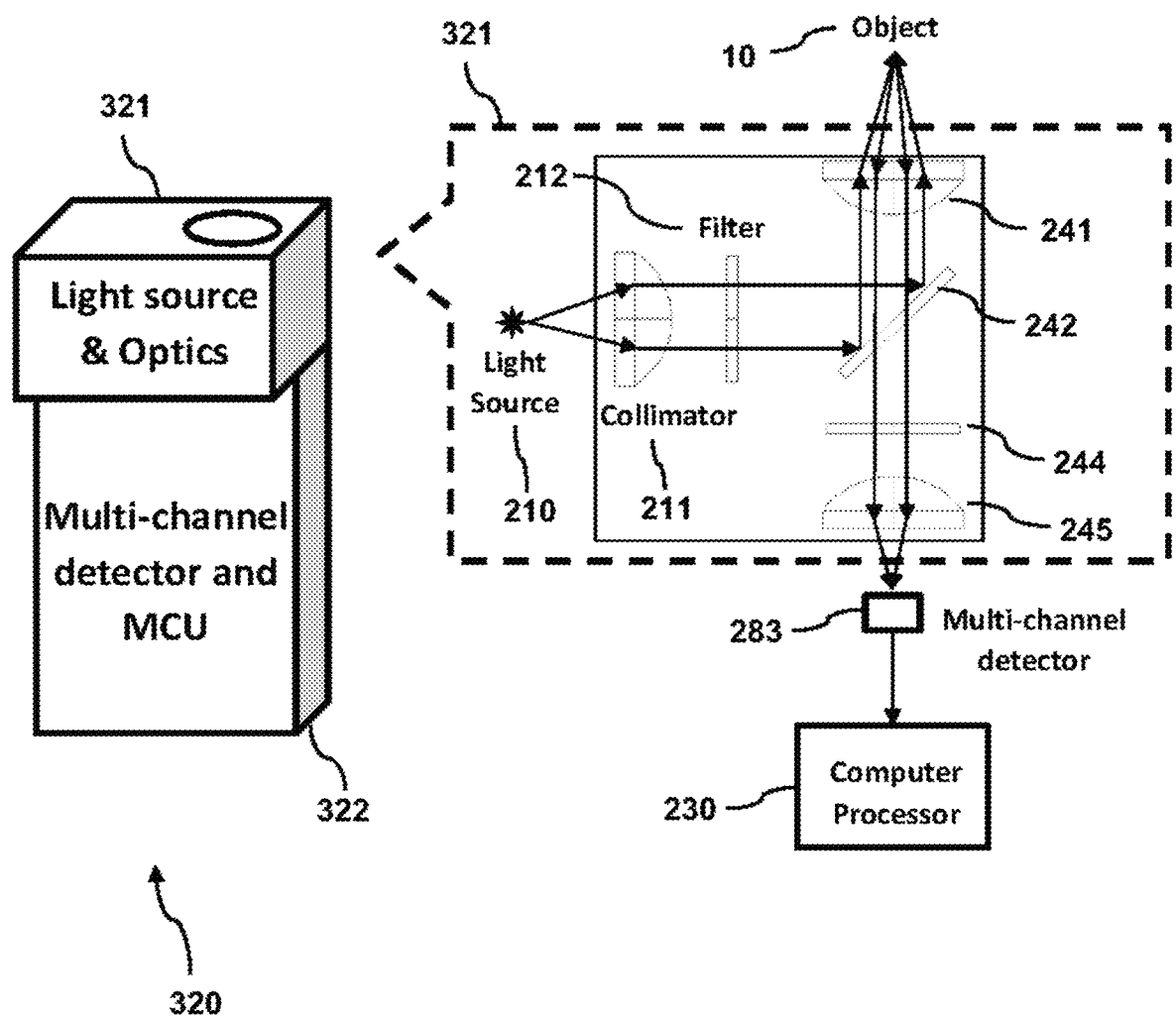
FIG. 4 depicts the internal structure of the forensic detector of FIG. 3.

FIGS. 3 and 4 show the system having the forensic detector as a removable accessory 320 for a smartphone 310 for remotely sensing a porphyrin-containing substance on a surface of an object and determining a concentration of the porphyrin-containing substance. The forensic detector 320 is mountable on and communicable to the smartphone 310. In the illustrated embodiment shown in FIG. 4, the removable accessory 320 is formed by two blocks, wherein the first block 321 includes an excitation light source 210 and plural optical elements 240, and the second block 322 includes a multi-channel detector 280 and a computer processor 230.

In greater detail, the excitation light source 210 is a 365 nm LED which generates an excitation light beam along a path to a second collimating lens 211 or equivalents, and collimates the excitation light beam from the LED to a dichroic mirror 242 at an incident angle 45°. In certain embodiments, a first filter 212, for example, a short-pass filter for wavelengths less than about 450 nm, may be disposed between the second collimating lens 211 and the dichroic mirror 242 for filtering the excitation light beam. The dichroic mirror 242 is arranged to transmit the incident excitation light beam and bend the forward path by 90 degrees towards the collimating lens 241 or equivalents. The collimating lens 241 is located between the dichroic mirror 242 and the object 10 for directing the excitation light beam onto the surface of the object 10 to perform sensing remotely. If the object 10 contains one or more types of the porphyrin-containing substances, such as facial material, the porphyrin-containing substances exhibit PL when excited by the excitation light beam to luminesce at a target wavelength centered between 665-675 nm, which is in the wavelength of the visible red light. The porphyrin-containing substances may luminesce for approximately 10 seconds.

The smartphone 310 is configured to capture an image of the surface after the excitation light beam irradiates the surface. In the image, a red pigmented region can be captured when the porphyrin-containing substances luminesce. A porphyrin distribution map having the red pigmented region for indicating a respective region on the surface containing the porphyrin-containing substance is generated from the image.

After irradiating the surface of the object 10 with an excitation light beam, an object-originated light beam coming from the surface is also transmitted to the forensic detector and captured by the optical elements 240. The collimating lens 241 collimates the object-originated light beam onto the dichroic mirror 242, and the object-originated light beam transmits through the dichroic mirror 242 and a second filter 244 to a third collimating lens 245. The second filter 244 may be a bandpass filter or a long-pass filter, and is configured to filter light with a wavelength other than the desired range. The third collimating lens 245 directs the object-originated light beam to the multi-channel detector 283 for measuring the first and second radiation powers. SNR can be determined accordingly, and the computing processor 230 is further configured to use the SNR for determining the concentration of the porphyrin-containing substance. Advantageously, the forensic detector of the present disclosure is a removable accessory 320 that can be integrated with a smartphone 310 without the need for a spectrometer. The system is compact and allows a non-professor operator to perform non-invasive forensic detection of facial residue and potentially other body fluids in a real-time, non-destructive, accurate, and portable manner.

Figure 5:
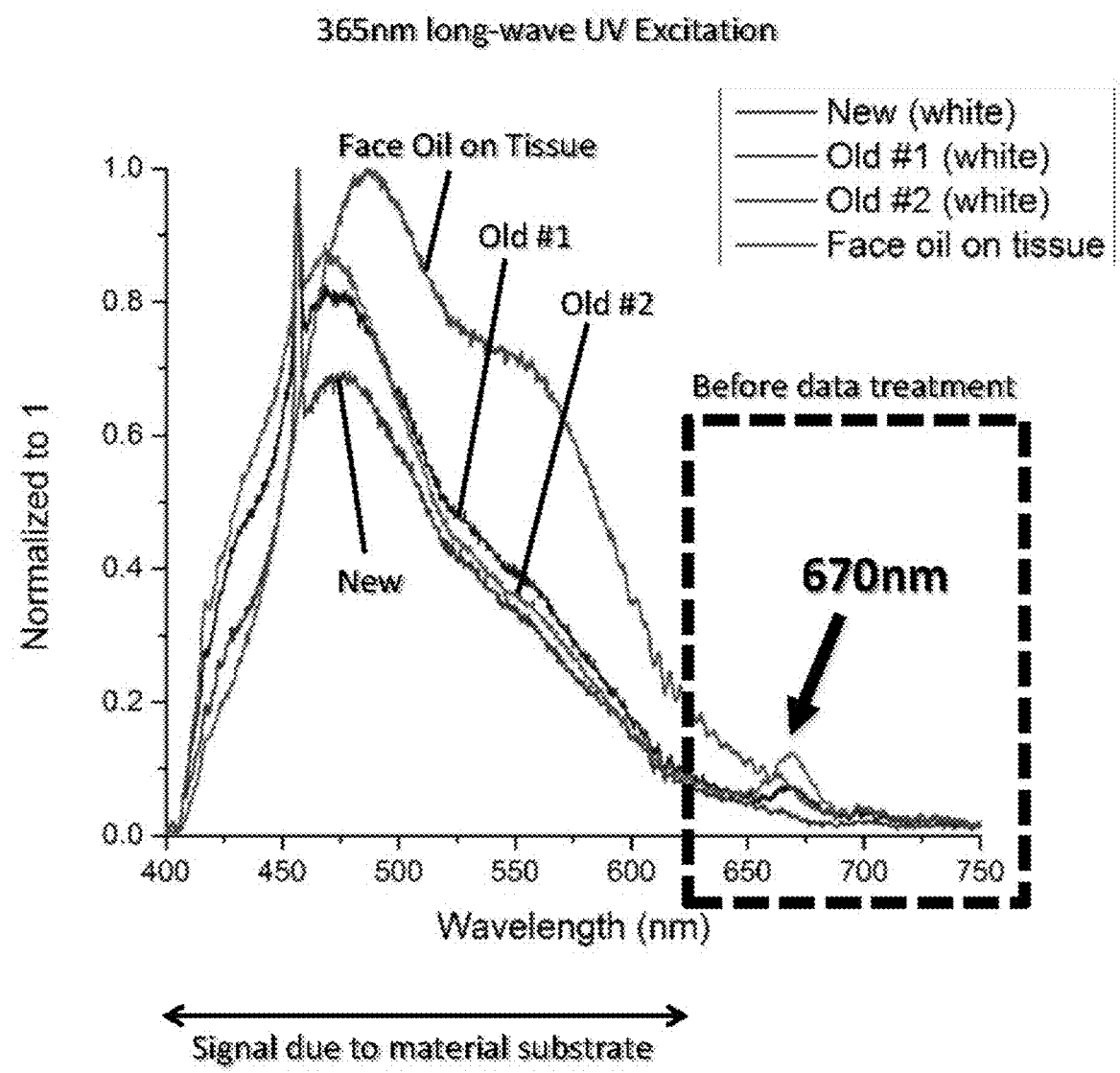
FIG. 5 depicts the spectral information of the reflected forensic light before data treatment when the object is irradiated by a 365 nm long-wave UV light for (1) a new face mask; (2) a first used face mask; (3) a second used face mask; and (4) a tissue paper with face oil.
Figure 6:
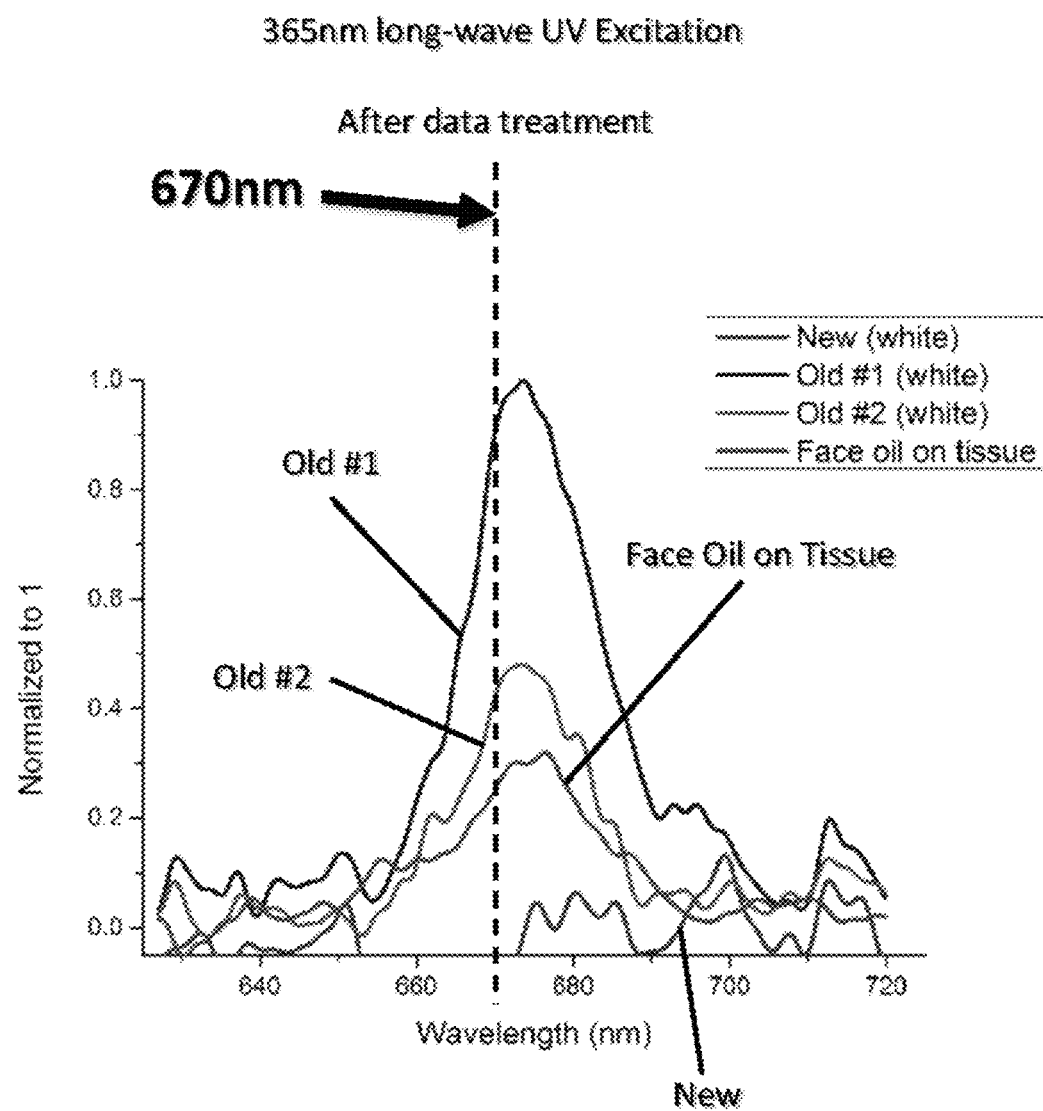
FIG. 6 depicts the post data treatment of the spectral information of FIG. 5.
Figure 7A:
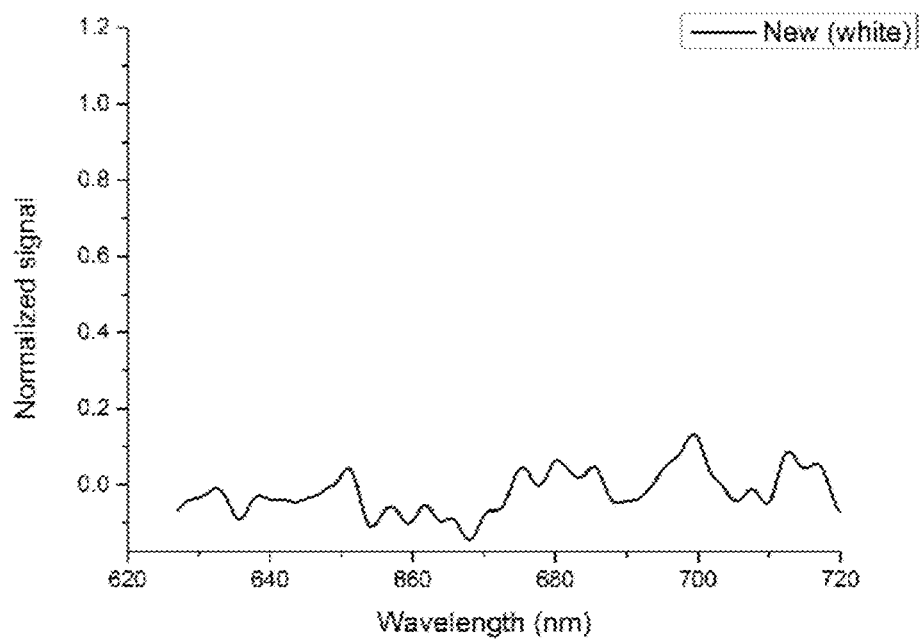
FIG. 7A depicts the post data treatment of the spectral information of FIG. 5 for a new face mask.
Figure 7B:
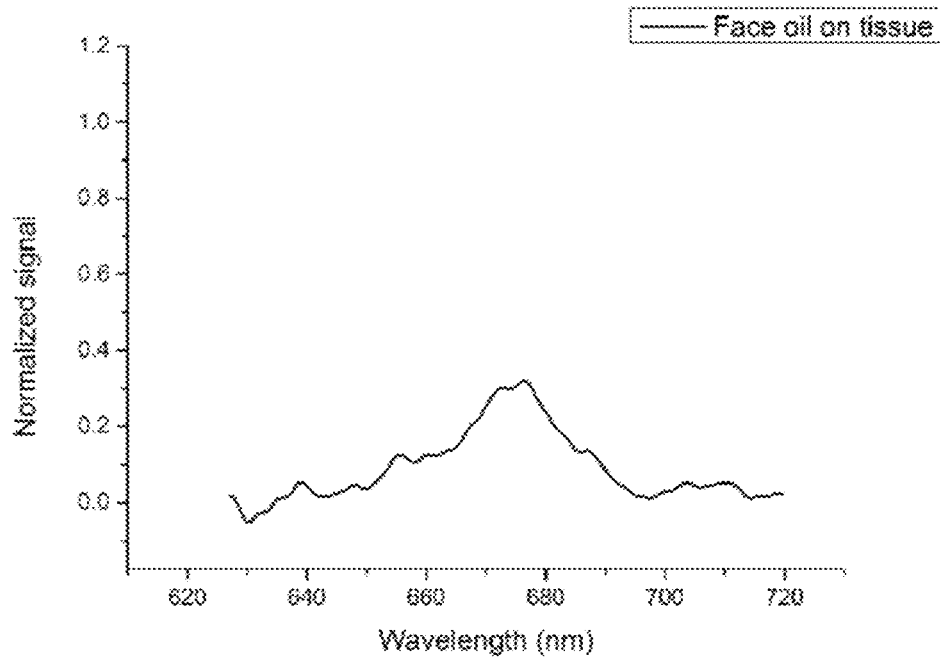
FIG. 7B depicts the post data treatment of the spectral information of FIG. 5 for a tissue paper with face oil.
Figure 7C:
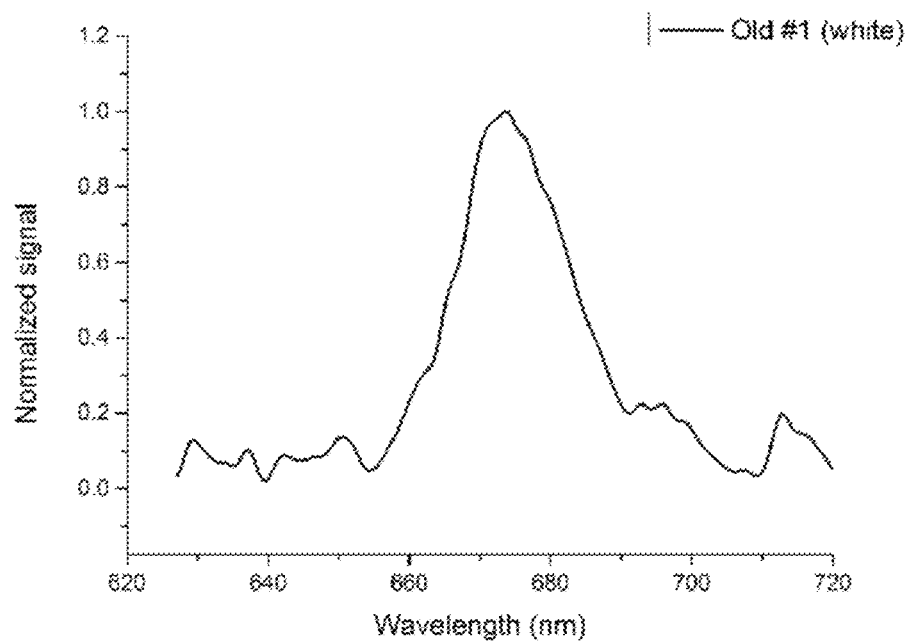
FIG. 7C depicts the post data treatment of the spectral information of FIG. 5 for a first used face mask.
Figure 7D:
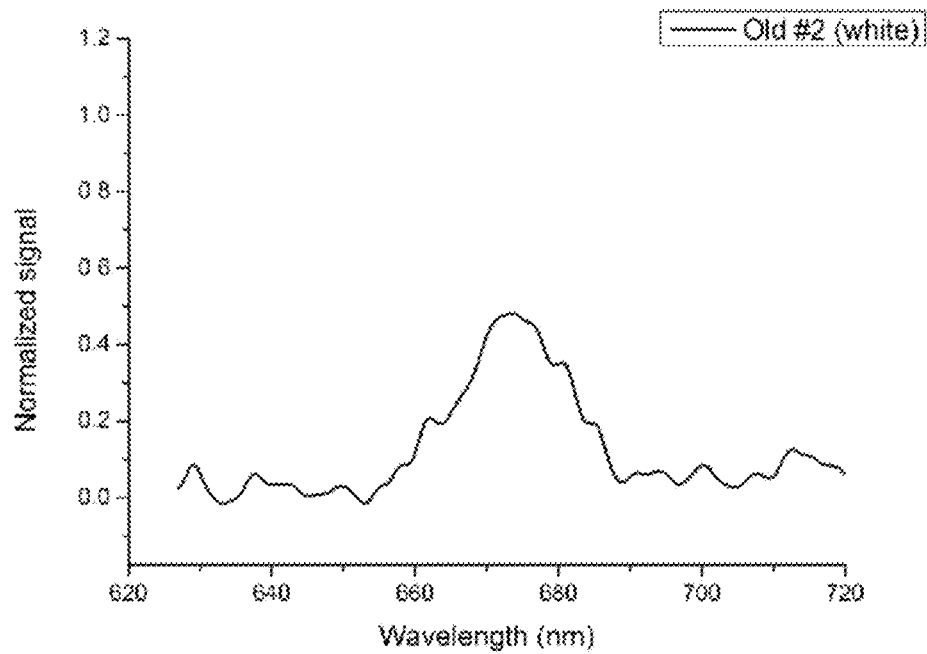
FIG. 7D depicts the post data treatment of the spectral information of FIG. 5 for a second used face mask.
Figure 8:
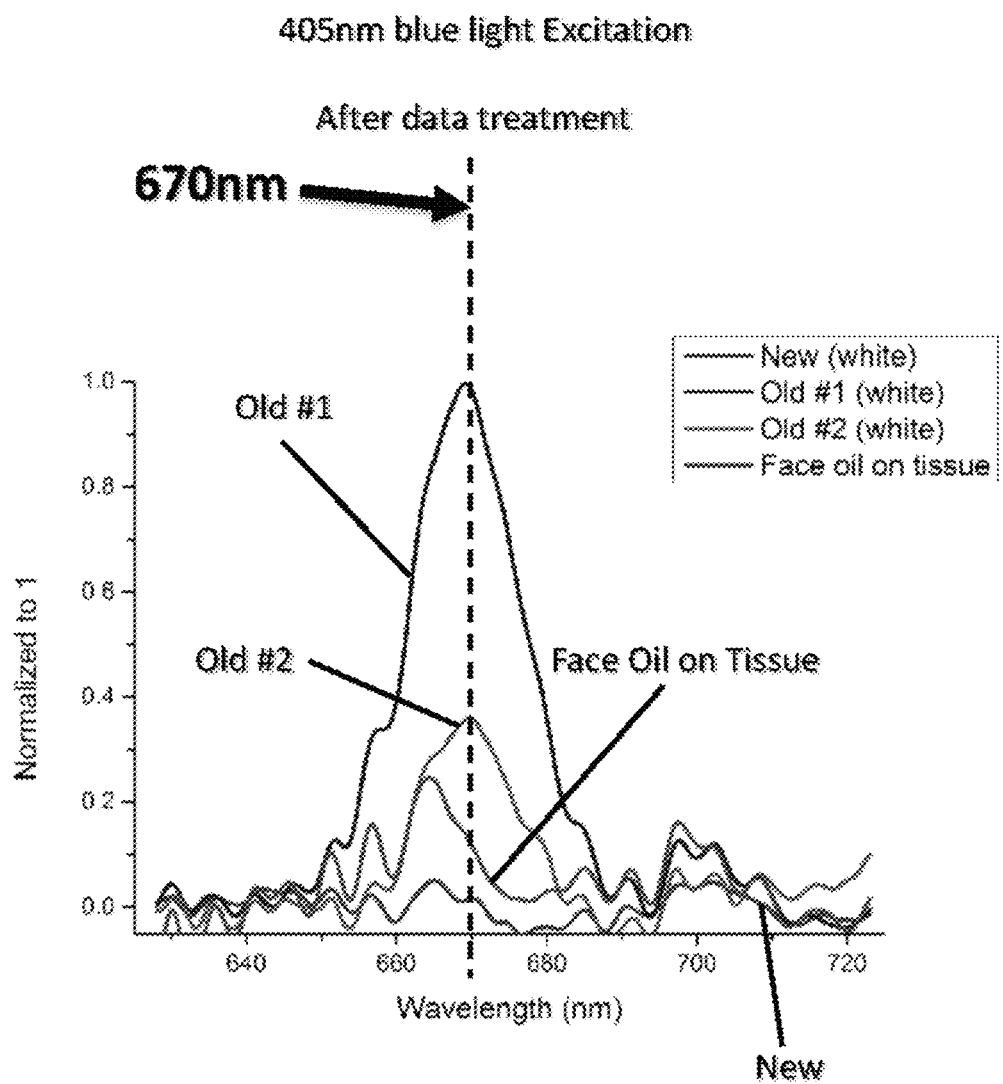
FIG. 8 depicts the post data treatment of the spectral information of the reflected forensic light when the object is irradiated by a 405 nm blue light for (1) a new face mask; (2) a first used face mask; (3) a second used face mask; and (4) a tissue paper with face oil.
Figure 9A:
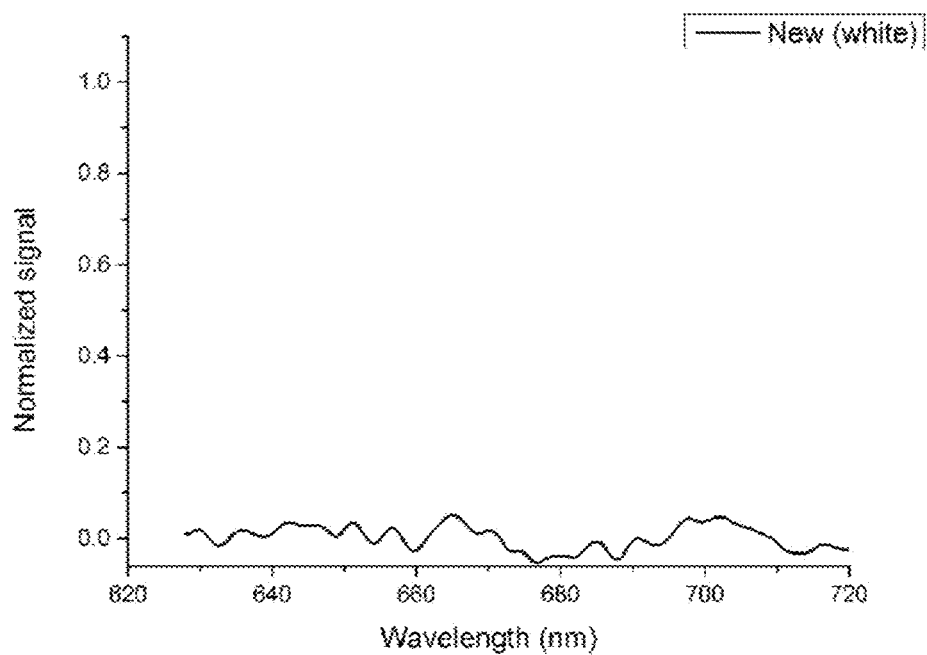
FIG. 9A depicts the spectral information of FIG. 8 for a new face mask.
Figure 9B:
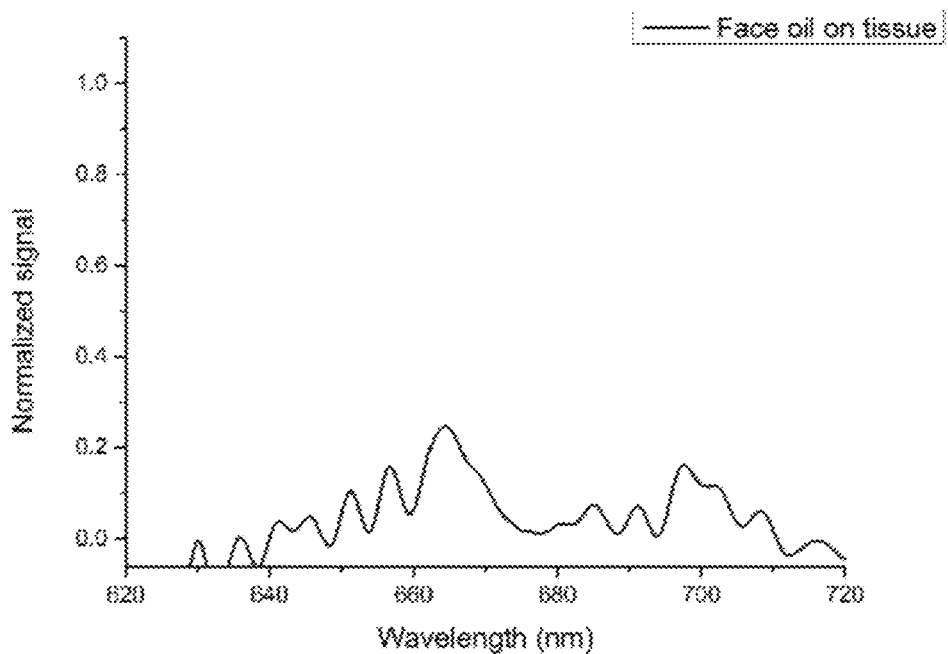
FIG. 9B depicts the spectral information of FIG. 8 for a tissue paper with face oil.
Figure 9C:
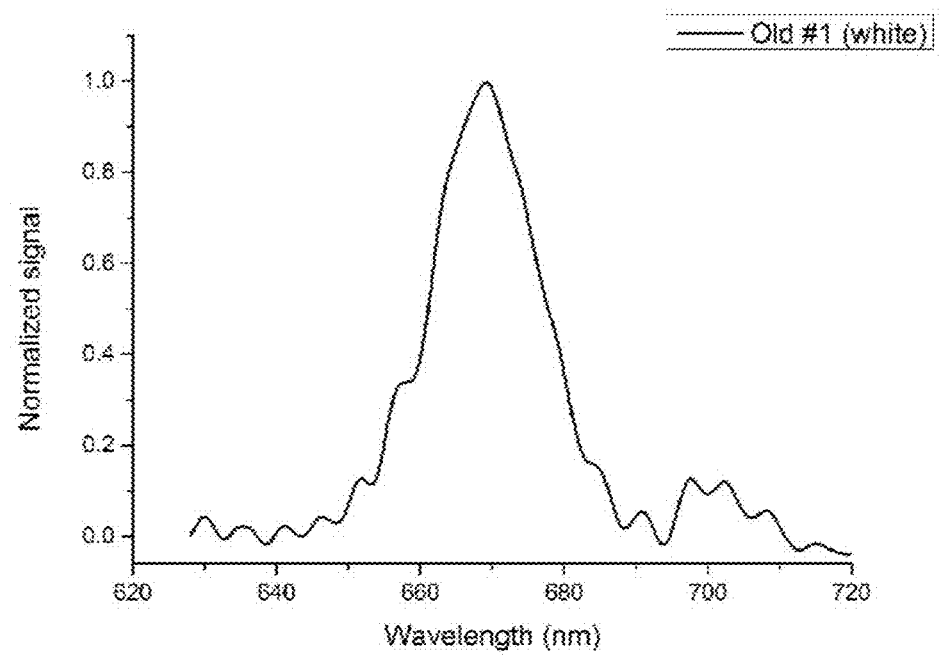
FIG. 9C depicts the spectral information of FIG. 8 for a first used face mask.
Figure 9D:
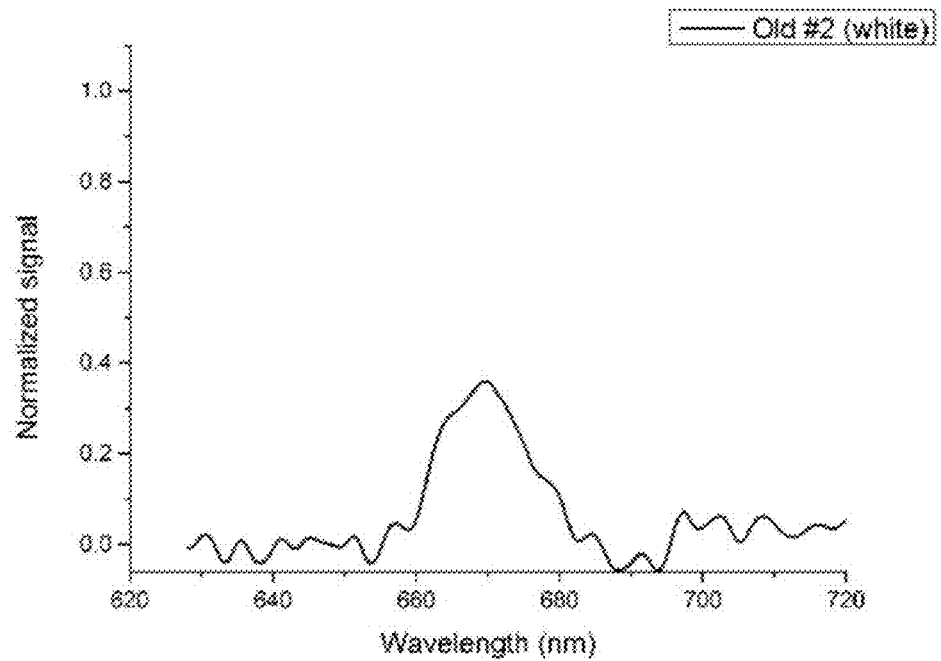
FIG. 9D depicts the spectral information of FIG. 8 for a second used face mask.

A feature of the present disclosure is related to the detection of a porphyrin-containing substance by an excitation light beam with an excitation wavelength in a range of 350-450 nm. FIG. 5 depicts the spectral information of the reflected forensic light when the object is irradiated by a 365 nm long-wave UV light for (1) a new face mask; (2) a first used face mask; (3) a second used face mask; and (4) a tissue paper with face oil. Before data processing, the PL peak at 670 nm is not obvious and much difficult to be identified. The shorter wavelength range, generally less than 620 nm, includes signals due to material substrate which will not carry the information for detecting the porphyrin-containing substance. The background noise, for computing the SNR, can be determined by measuring the one or more second radiation powers in a second wavelength region and used to calculate the standard deviation. In certain embodiments, the second wavelength region is approximately at 620 nm or in a range between 725 nm to 750 nm, where no signal peak is observed in the spectrum.

To perform the analysis, the PL signal is extracted by algorithms executed by the computer processor 230. The first step is to select the wavelength range for detection. The PL characteristic is generally observed at a target wavelength centered between 665-675 nm, so this wavelength range is selected. Third or higher degree of polynomial curve fitting is used to filter the selected region across the wavelength axis. The radiation power in the selected wavelength range is processed by noise minimization and background subtraction.

In certain embodiments, the one or more sensors 280 are configured to obtain a time sequence of first radiation power values, with each of the time sequence of first radiation power values being a measurement of the first radiation power obtained at one time instant. As the measurement is executed at a sequence of time, the computer processor is further configured to filter the time sequence of first radiation power values for noise reduction.

The computer processor 230 is further configured to compute an SNR according to the first radiation power and the background noise power level. Particularly, the SNR is computed as the first radiation power divided by the standard deviation of the background noise power level at regions other than the first wavelength region, wherein the background noise power level may be obtained from the one or more second radiation powers. As the second radiation power is in the range other than the first wavelength region and carries the background information, the SNR obtained is characterized in that the background curve can be subtracted. The SNR can also be used to perform quantitative assessment by comparing with different samples to determine the threshold, which is based on a plurality of reference SNRs obtained from reference objects with and without the porphyrin-containing substance.

After the data treatment, the spectral information for (1) a new face mask, (2) a first used face mask, (3) a second used face mask, and (4) a tissue paper with face oil are compared, as depicted in FIG. 6, and FIGS. 7A-7D. In the case of a used face mask or a tissue paper with face oil, a PL peak centered between 665-675 nm is observed, while such a PL peak is not found in a new face mask. This result suggests that the used face mask is similar to the tissue paper with face oil, while the higher radiation power in the face mask may be caused by other porphyrin-containing substance that may be left on the face mask after using for a few hours.

FIG. 8 and FIGS. 9A-9D depict the spectral information of the reflected forensic light when the object is irradiated by a 405 nm blue light for (1) a new face mask, (2) a first used face mask, (3) a second used face mask, and (4) a tissue paper with face oil. The results are consistent with that in FIG. 6, and FIGS. 7A-7D, demonstrating that the excitation light source can be in the long-UV light region or in the blue light region.

Figure 10:
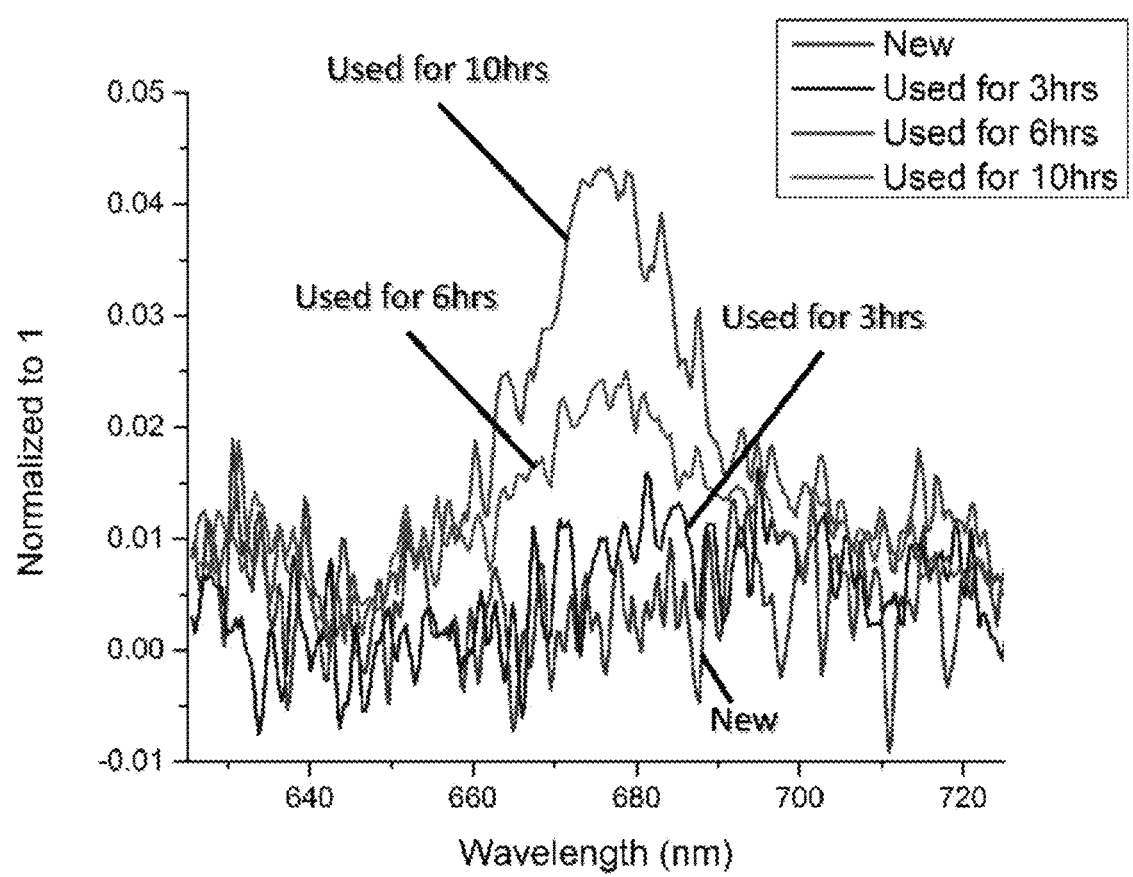
FIG. 10 depicts the spectral information of a face mask of different qualities.

FIG. 10 is a graph depicting the spectral information of a face mask of different qualities. The face masks used for 3 hours, 6 hours, and 10 hours are compared with a new face mask. The trend shows that when the face mask is used for a more extended period of time, there are more porphyrin-containing substances left on the face mask and the radiation power measured is higher.

This illustrates the fundamental apparatus and system remotely sensing a porphyrin-containing substance on a surface of an object in accordance with the present disclosure. It will be apparent that variants of the above-disclosed and other features and functions, or alternatives thereof, may be combined into many other different systems or apparatuses. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A system for remotely sensing a porphyrin-containing substance on a surface of an object and determining a concentration of the porphyrin-containing substance, the system comprising:
   a smartphone; and
   a forensic detector mountable on and communicable to the smartphone, wherein the forensic detector comprises:
      an excitation light source comprising one or more light-emitting diodes for generating an excitation light beam, wherein the excitation light beam has an excitation wavelength in a range of 350-450 nm capable of exciting porphyrin to luminesce at a target wavelength centered between 665-675 nm such that photoluminescence is exhibited;
      plural optical elements configured and arranged to direct the excitation light beam onto the surface and to capture an object-originated light beam coming from the surface, and to extract first and second light components of the object-originated light beam simultaneously, the first and second light components respectively havin2 wavelength contents on the first wavelength region and on the second wavelength region;
      one multi-channel sensor configured to simultaneously measure a first radiation power in a first wavelength region of the object-originated light beam and one or more second radiation powers in a second wavelength region thereof, wherein the first wavelength region includes the target wavelength and wherein the first and second wavelength regions are non-overlapping, and
   a computer processor communicable to the smartphone configured to compute a signal-to-noise ratio (SNR) according to the first radiation power and a background noise power level, wherein the background noise power level is obtained from the one or more second radiation powers,
   wherein: the plural optical elements comprising a dichroic mirror located on an intersection of a Forward path of the excitation light beam emitted from the excitation light source, and a return path of the object-originated light beam coming from the object, such that the excitation light beam incident to the dichroic mirror at an incident angle of 45 degrees is bent by 90 degrees towards the surface of the object; and a collimating lens located between the dichroic mirror and the object for directing the excitation light beam onto the surface and collimating the object-originated light beam onto the dichroic mirror;
   the smartphone is configured to capture an image of the surface after the excitation light beam irradiates the surface;
   a porphyrin distribution map having a red pigmented region for indicating a respective region on the surface containing the porphyrin-containing substance is generated from the image; and
   the smartphone having a computing processor is further configured to determine the concentration of the porphyrin-containing substance based on the SNR and comparing the SNR with a plurality of reference SNRs obtained from reference objects in order to assess an extent of usage of the object.

2. The system of claim 1, wherein the object comprises face mask, pillow cover, bedsheet, tissue paper, clothes, fabrics, and/or articles for hygiene examination, and wherein the porphyrin-containing substances comprises facial residue and body fluid.

3. A system for remotely sensing a porphyrin-containing substance on a surface of an object, the system comprising:
  a probe having an excitation light source, plural optical elements and one or more sensors; wherein:
    the excitation light source is configured to generate an excitation light beam, wherein the excitation light beam has an excitation wavelength in a range of 350-450 nm capable of exciting porphyrin to luminesce at a target wavelength centered between 665-675 nm such that photoluminescence is exhibited; and
    the excitation light beam is directed at an incident angle of 45 degrees is bent by 90 degrees towards the surface of the object by at least one of the plural optical elements, and the one or more sensors capture an object-originated light beam coming from the surface;
  and
  a computer processor configured to execute a method for determining if the porphyrin-containing substance is present on the surface, wherein the method comprising the steps of:
    performing spectral analysis on the object-originated light beam to detect a first radiation power in a first wavelength region of the object-originated light beam, wherein the first wavelength region includes the target wavelength centered between 665 nm and 675 nm;
    performing spectral analysis on the object-originated light beam to detect one or more second radiation powers in a second wavelength region of the object-originated light beam simultaneously with the first radiation power in the first wavelength region thereof detected by the same set of sensors, wherein the second wavelength region is approximately 620 nm or between 725 nm and 750 nm; and
    computing a signal-to-noise ratio (SNR) according to the first radiation power and a background noise power level, and determining if the porphyrin-containing substance is present on the surface according to the SNR, wherein the background noise power level is obtained from the one or more second radiation powers.

4. The system of claim 3, wherein the excitation light beam contains long-wave ultraviolet or blue light.

5. The system of claim 3, wherein:
  the one or more sensors are configured to obtain a time sequence of first radiation power values each being a measurement of the first radiation power obtained at one time instant; and
  the computer processor is configured to filter the time sequence of first radiation power values for noise reduction.

6. The system of claim 3, wherein the SNR is computed as the first radiation power divided by the standard deviation of the background noise power level at regions other than the first wavelength region.

7. The system of claim 3, wherein the step of determining if the porphyrin-containing substance is present further comprises comparing the SNR with a threshold defined by a plurality of reference SNRs obtained from reference objects with and without the porphyrin-containing substance.

8. The system of claim 3, wherein the object comprises face mask, pillow cover, bedsheet, tissue paper, clothes, fabrics, and/or articles for hygiene examination, and wherein the porphyrin-containing substances comprises facial residue and body fluid.

9. A method for remotely sensing a porphyrin-containing substance on a surface of a face mask using a compact device in a last and portable manner, the method comprising:
  exciting porphyrin in the porphyrin-containing substance on the surface of the face mask with an excitation light beam generated from an excitation light source of the compact device with an excitation wavelength in a range of 350-450 nm for said exciting the porphyrin to luminesce an object-originated light beam at a target wavelength centered between 665-675 nm;
  directing the excition light beam through an optical element of the compact device onto the surface of the face mask, the optical element disposed along a forward path of the excitation light beam to bend the excitation light beam and to allow the return path of the object-originated light beam to transmit therethrough;
  capturing the object-originated light beam coming from the surface of the face mask through said optical element by a set of sensors of the compact device;
  extracting first and second light components of the object-originated light beam simultaneously, the first and second light components respectively having wavelength contents on a first wavelength region and on a second wavelength region;
  performing a method for determining presence and quantity of porphyrin-containing substance on the surface of the face mask by a computing processor of the compact device, the method for determining the presence and quantity of the porphyrin-containing substance on the surface of the face mask comprising the steps of:
    performing a spectral analysis on the object-originated light beam to detect a first radiation power in the first wavelength region of the object-originated light beam, the first wavelength region includes the target wavelength centered between 665 nm and 675 nm;
    performing a spectral analysis on the object-originated light beam to detect one or more second radiation powers in the second wavelength region of the object-originated light beam simultaneously with the first radiation power in the first wavelength region thereof detected by the same set of sensors, wherein the first and second wavelength regions are non-overlapping, and the second wavelength region is approximately 620 nm or between 725 nm and 750 nm;
    computing a signal-to-noise ratio (SNR) according to the first radiation power and a background noise power level, the background noise power level obtained from the one or more second radiation powers, and the SNR being computed as the first radiation power divided by the standard deviation of the background noise power level at regions other than the first wavelength region;
    determining the presence of the porphyrin-containing substance on the surface of the face mask according to the SNR; and
    determining the quantity of the porphyrin-containing substance on the surface of the face mask by comparing said SNR with a threshold defined by a plurality of reference SNRs obtained from reference face masks with or without the porphyrin-containing substance in order to determine an extent of usage of the face mask.

10. The method of claim 9, wherein the computing processor is configured to control the excitation light source and the sensors such that the sensors measure the first and second radiation powers while the excitation light beam is generated and directed to the surface.

11. The method of claim 9, wherein the excitation light beat contains long-wave ultraviolet or blue light.

12. The method of claim 9, wherein said optical element is a dichroic mirror located on an intersection of the forward path of the excitation light beam emitted from the excitation light source, and the return path of the object-originated light beam coming from the face mask, such that the excitation light beam incident to the dichroic mirror at an incident angle of 45 degrees is bent by 90 degrees towards the surface of the face mask.

13. The method of claim 12, wherein the compact device further comprises a collimating lens located between the dichroic mirror and the face mask for directing the excitation light beam onto the surface of the face mask and collimating the object-originated light beam onto the dichroic mirror.

14. The method of claim 9, wherein one or more of the sensors are further configured to obtain a time sequence of first radiation power values each being a measurement of the first radiation power obtained at one time instant; and
the computing processor is further configured to filter the time sequence of first radiation power values for noise reduction.

15. The method of claim 9, wherein the compact device is selected from a smartphone or a portable detector mountable on and communicable to a smartphone.

16. The method of claim 9, wherein the excitation light beam is bent by the optical element to a direction substantially opposite or 180 degrees with respect to that of the return path of the object-originated light beam.

* * * * *